(12) United States Patent
Hoover

(10) Patent No.: US 12,454,179 B2
(45) Date of Patent: Oct. 28, 2025

(54) TOUCHSCREEN HAVING PHYSICAL CONTROLS

(71) Applicant: Honda Motor Co., Ltd., Tokyo (JP)

(72) Inventor: Andrew R. Hoover, West Liberty, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 323 days.

(21) Appl. No.: 18/162,336

(22) Filed: Jan. 31, 2023

(65) Prior Publication Data

US 2024/0253462 A1 Aug. 1, 2024

(51) Int. Cl.
*G06F 3/048* (2013.01)
*B60K 35/00* (2006.01)
*B60K 35/10* (2024.01)

(52) U.S. Cl.
CPC .............. *B60K 35/00* (2013.01); *B60K 35/10* (2024.01); *B60K 2360/11* (2024.01); *B60K 2360/122* (2024.01); *B60K 2360/131* (2024.01); *B60K 2360/1438* (2024.01); *B60K 2360/688* (2024.01)

(58) Field of Classification Search
CPC .............. B60K 35/00; B60K 2360/131; B60K 2360/11; B60K 2360/1438; B60K 35/10; B60K 2360/688; B60K 2360/122
See application file for complete search history.

(56) References Cited

U.S. PATENT DOCUMENTS

| | | | | |
|---|---|---|---|---|
| 7,656,393 B2* | 2/2010 | King | ................... | G06F 3/04847 345/169 |
| 8,612,856 B2* | 12/2013 | Hotelling | ............ | G06F 3/04883 715/702 |
| 8,818,624 B2* | 8/2014 | Small | .................. | G06F 3/04886 701/487 |
| 8,854,433 B1* | 10/2014 | Rafii | ...................... | G06F 3/011 348/42 |
| 9,047,009 B2* | 6/2015 | King | ................... | G06F 3/03547 |
| 9,495,088 B2 | 11/2016 | Garcia, Jr. et al. | | |
| 9,606,668 B2* | 3/2017 | Hotelling | ............ | G06F 3/04883 |
| 9,842,458 B2 | 12/2017 | Bartosik | | |
| 9,983,742 B2* | 5/2018 | King | ................... | G06F 3/03547 |
| 10,386,980 B2* | 8/2019 | King | ................... | G06F 3/04883 |
| 2005/0168488 A1* | 8/2005 | Montague | ........... | G06F 3/04845 345/660 |
| 2008/0211779 A1* | 9/2008 | Pryor | .................... | G06F 3/0425 345/173 |
| 2009/0207144 A1* | 8/2009 | Bridger | ................. | G06F 3/0488 345/173 |
| 2009/0295753 A1* | 12/2009 | King | ..................... | G06F 1/1626 345/174 |

(Continued)

FOREIGN PATENT DOCUMENTS

CN 207020653 U 2/2018
EP 2581248 B1 11/2016

(Continued)

*Primary Examiner* — David Phantana-angkool
(74) *Attorney, Agent, or Firm* — Plumsea Law Group, LLC

(57) ABSTRACT

A user interface includes a touchscreen display screen, a frame disposed around the touchscreen display screen, and a first physical control connected to the frame being disposed over a first portion of the touchscreen display screen, and a contact portion fixed to the first physical control and contacting the touchscreen display screen.

11 Claims, 7 Drawing Sheets

(56) References Cited

U.S. PATENT DOCUMENTS

| | | | |
|---|---|---|---|
| 2010/0182137 A1* | 7/2010 | Pryor | B60K 35/10 340/425.5 |
| 2018/0006646 A1 | 1/2018 | Moriyasu | |
| 2020/0073513 A1 | 3/2020 | Ballan et al. | |
| 2024/0253462 A1* | 8/2024 | Hoover | B60K 35/00 |

FOREIGN PATENT DOCUMENTS

| | | |
|---|---|---|
| JP | 4924412 B2 | 4/2012 |
| KR | 20120111197 A | 10/2012 |
| WO | 2006025588 A1 | 3/2006 |

* cited by examiner

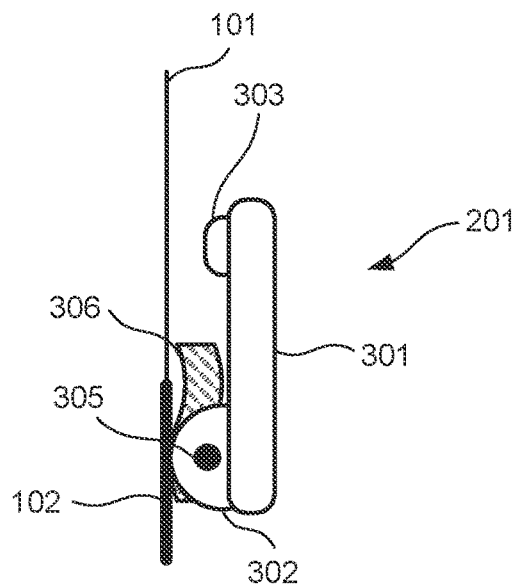
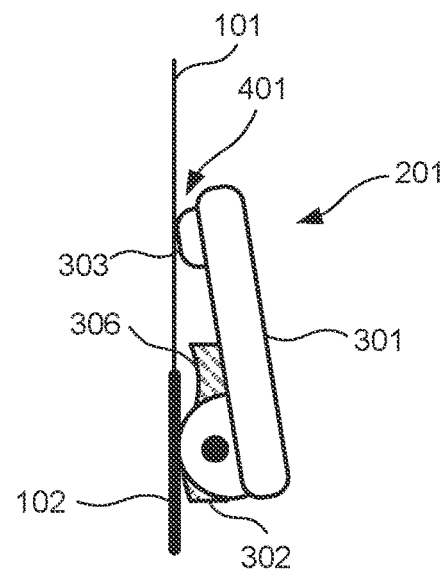
FIG. 3　　　　　　FIG. 4
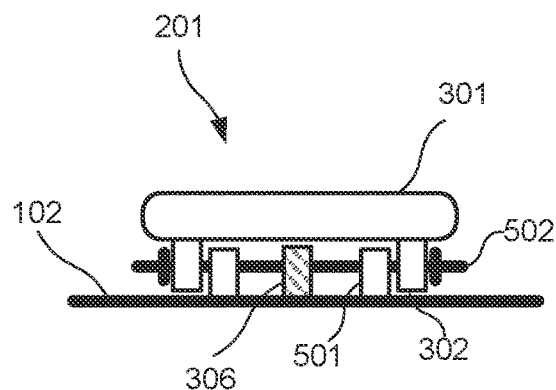
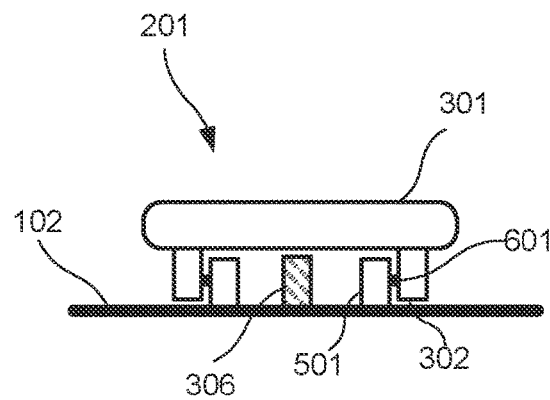
FIG. 5　　　　　　FIG. 6

TOUCHSCREEN HAVING PHYSICAL CONTROLS

BACKGROUND

1. Field of the Disclosure

The present disclosure relates to an input system, and more particularly to a touchscreen having physical controls.

2. Description of Related Art

Generally, vehicles may be equipped with displays, such as center console displays, touchscreen displays, or other displays. One or more of these displays may be utilized as a user interface (UI) to render information for a driver, passenger, or other occupant of a vehicle. For example, a display may render the day, the time, navigation instructions, etc. The displays may also be used to facilitate the input of information from the occupants, for example, using control elements displayed on the touchscreen.

SUMMARY OF THE INVENTION

The present disclosure is directed to improvements in vehicle controls. In one aspect, a transparent button is disposed over a touchscreen and enables interactions with the touchscreen below. In some aspects, a physical control is associated with a split screen display. In one example, the physical control is a physical slider that controls a boundary between different areas of a display. that feedback directly to the area of the screen that is split.

In one or more aspects, a user interface comprises: a touchscreen display screen; a frame disposed around the touchscreen display screen; a first physical control connected to the frame and slidable along an edge of the frame, the physical control being disposed over a first portion of the touchscreen display screen; and a contact portion fixed to the first physical control and contacting the touchscreen display screen.

In some aspects, a user interface comprises: a display screen; a frame disposed around the display screen, wherein the frame comprises a lower recess; a first physical control connected to the frame and slidable along an edge of the frame, the physical control being disposed over a first portion of the display screen; and a position detector configured to sense a position of the first physical control along the edge of the frame.

In one aspect, a user interface comprises: a touchscreen display; a frame disposed around the touchscreen display; and a physical control disposed over a portion of the touchscreen display, wherein the physical control is formed of a transparent material, the physical control being connected to the frame.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 3 illustrates an embodiment of a physical control according to some embodiments;

FIG. 4 illustrates an embodiment of a physical control according to some embodiments;

FIG. 5 illustrates an embodiment of a physical control according to some embodiments;

FIG. 6 illustrates an embodiment of a physical control according to some embodiments;

DETAILED DESCRIPTION

There is a need in the art for a system and method that provides for a user interface (UI) for a vehicle computer system, where the UI includes a display and at least one physical control. In one aspect, a physical button is disposed over a touchscreen display and enables interactions with the touchscreen below. This button may be transparent, such that a virtual control displayed by the touchscreen may be perceived by an occupant of the vehicle. In another aspect, a physical control is associated with a display and controls a feature of a displayed UI. In one example, the physical control may be a physical slider that controls a boundary between different areas of the displayed UI.

Figure 1:
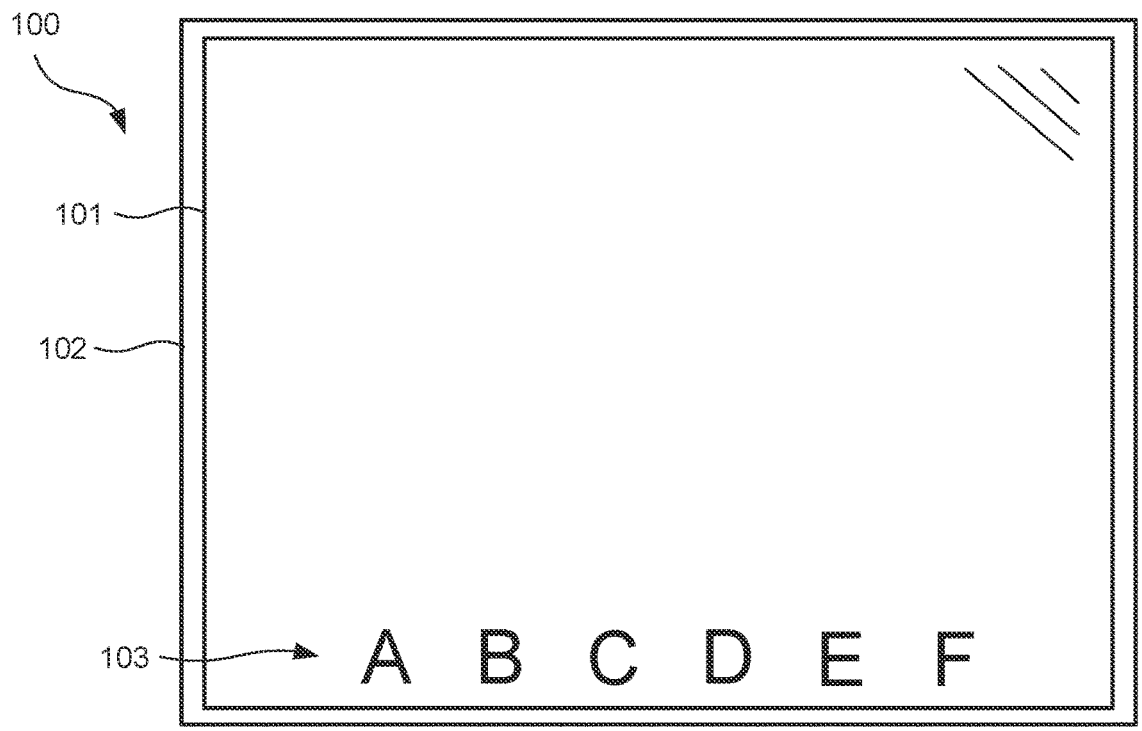
FIG. 1 illustrates an embodiment of a user interface (UI) including a touchscreen according to some embodiments.

FIG. 1 is an illustration of a first UI 100. The first UI 100 may include a touchscreen display 101 and a frame 102. The touchscreen display 101 may display objects, graphics elements, and content items. In FIG. 1, the touchscreen display 101 displays letter objects. The displayed "A" 103 is an example object. These objects may be associated with instructions that cause a computer system to perform an action. That is, the letter objects, including "A" 103 are selectable.

Figure 2:
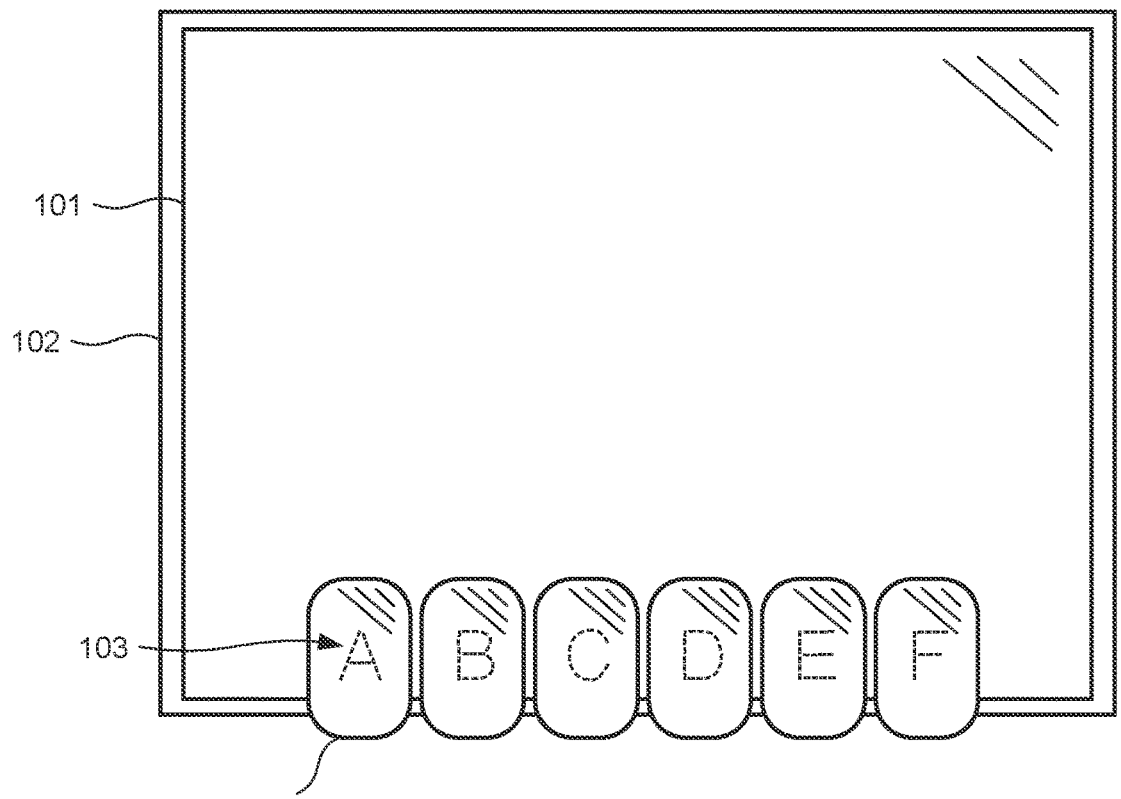
FIG. 2 illustrates an embodiment of the UI of FIG. 1 including the touchscreen and a physical control to some embodiments.

FIG. 2 is an illustration of a first UI 100 further including a plurality of physical controls. A first physical control 201 is disposed over a portion of the touchscreen display 101 that displays the "A" 103. The physical controls are transparent, such that the objects, graphic elements, and content items displayed by touchscreen display 101 are visible through the physical controls.

The physical controls may be formed of polycarbonate, acrylic, polyvinyl chloride (PVC), liquid silicone rubber (LSR), ionomer resins, styrene methyl methacrylate (SMMA), and other clear materials. These materials may be scratch resistant and have optical clarity sufficient to perceive the displayed objects, graphic elements, and content items.

FIG. 3 illustrates an embodiment of the first physical control 201 according to some embodiments. The first physical control 201 may include a lever portion 301, a pivot portion 302, and a contact portion 303. The pivot portion 302 may be connected to the frame 102 of the first UI 100.

FIG. 4 illustrates an embodiment of the first physical control 201 according to some embodiments. As illustrated, the lever portion 301 may be depressed, such that the lever portion 301 pivots above the pivot portion 302. The depression of the lever portion 301 may bring the contact portion 303 into contact with the touchscreen display 101. That is, the pivot portion 302 is configured to facilitate a rotation of the the lever portion 301 and a contact between the contact portion 303 and the touchscreen display 101.

The contact between the contact portion 303 and the touchscreen display 101, shown at contact point 401, and more particularly contact with the portion of the touchscreen display 101 that displays an object, graphic element, or content item, may cause the computer system to perform an action associated with the object, graphic element, or content item. For example, upon selection of the displayed "A" 103, the UI may display a default screen or tune to a stored radio station. These and other operations are contemplated.

The contact portion 303 may be formed of a same material as the other portions of the physical control. For example, as described herein, the materials may be a clear material such as an ionomer resin. This material may be used in the case of a resistive type touchscreen display. In an example case of a capacitive type touchscreen display the contact portion 303 may be formed of a material that conducts electricity. These materials may include metals, such as copper, and conductive polymers, such as, polyacetylene or doped polyacetylene.

FIG. 5 illustrates an embodiment of the first physical control 201 according to some embodiments. In some examples, the first physical control 201 includes one or more pivot portions 302, which cooperate with fixed stand off portions 501 on the frame 102. The pivot portions 302 and fixed stand off portions 501 may be joined by a pin 502. As illustrated in FIG. 6 pivot portions 302 and fixed stand off portions 501 may be joined by a projection 601 from the fixed stand off portions 501 that align with holes 305 in the pivot portions 302 (see FIG. 3). According to some aspects, the holes may be in the fixed stand off portions 501 in a case where the projections 601 extend from the pivot portions 302. These and other mechanisms enabling selection of the physical control 201 are contemplated.

According to one aspect, the first physical control 201 may include a mechanism for returning the lever portion 301 to an initial position illustrated in FIG. 3. According to one aspect, in the initial position the contact portion 303 does not physically contact the touchscreen display 101. The mechanism may be for example, a resilient member 306 that resists the depression of the lever portion 301 and returns the lever portion 301 to the initial position after a user releases the first physical control 201. Other mechanisms may include a captive spring and a resilient diaphragm, which may resist the depression of the lever portion 301 and return the lever portion 301 to the initial position after a user releases the first physical control 201.

Figure 7:
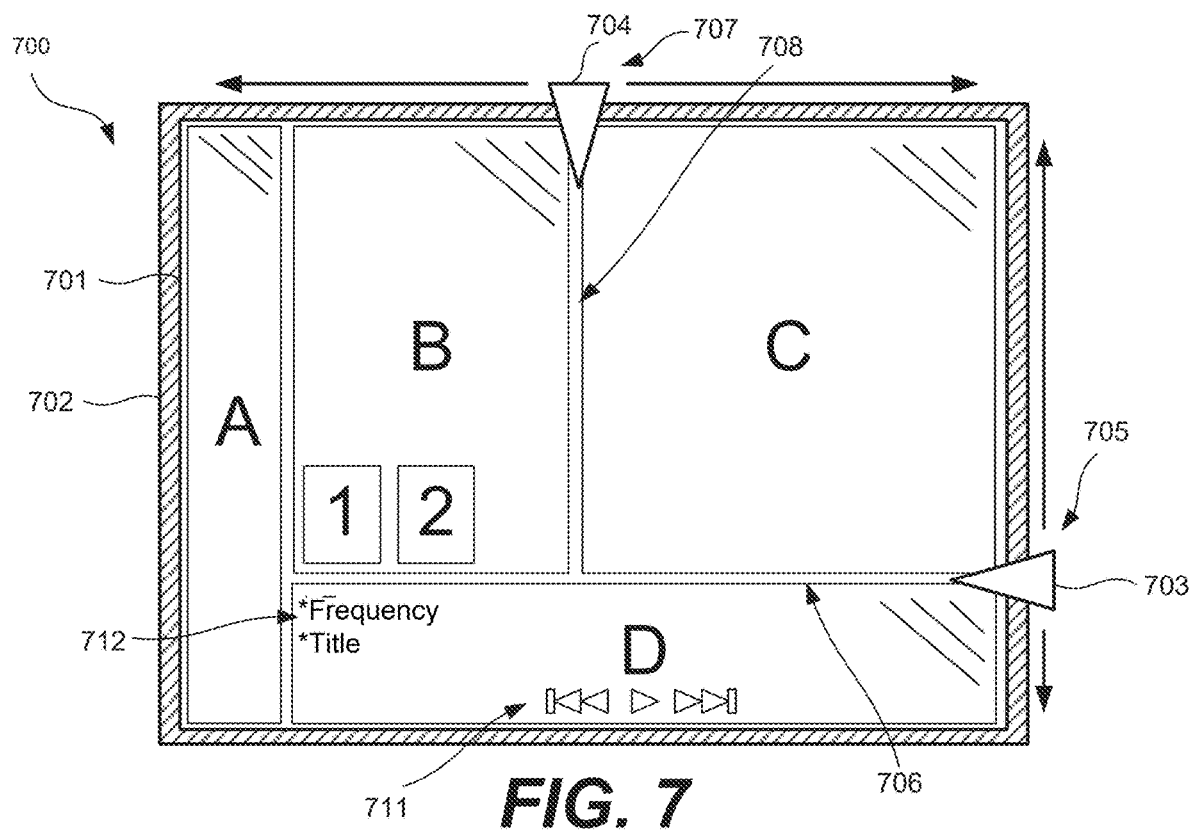
FIG. 7 illustrates an embodiment of a UI including a slider control according to some embodiments.

FIG. 7 illustrates an embodiment of a second UI 700 including a vertical slider control 703 and a horizontal slider control 704 according to some embodiments. The second UI 700 may include a display 701 and a frame 702. The slider controls are slidable within the frame 702 and sensors sense a position of each slider. The sensors may be a touchscreen display screen or another sensor.

The position of the slider may be used to control objects, graphic elements, or content items displayed by the display 701. For example, when the vertical slider control 703 is moved from a first vertical position 705 to a second vertical position 709 (see FIG. 8), a position of a first horizontal boundary 706 is moved according to the second vertical position 709. Similarly, when the horizontal slider control 704 is moved from a first horizontal position 707 to a second horizontal position 710, a position of a first vertical boundary 708 is moved according to the second horizontal position 710. The first horizontal boundary 706 and the first vertical boundary 708 are examples of graphic elements.

According to some aspects, the sliders may be used to manipulate objects, graphic elements, or content items. For example, the movement of the boundary type graphic elements is associated with a corresponding size of objects "B", "C", and "D". These objects may be windows for displaying a widget or content item, for example. As illustrated, the UI may include immutable objects, graphic elements, or content items. For example, object "A" is not adjusted by the movement of the vertical slider control 703 or the horizontal slider control 704.

Figure 8:
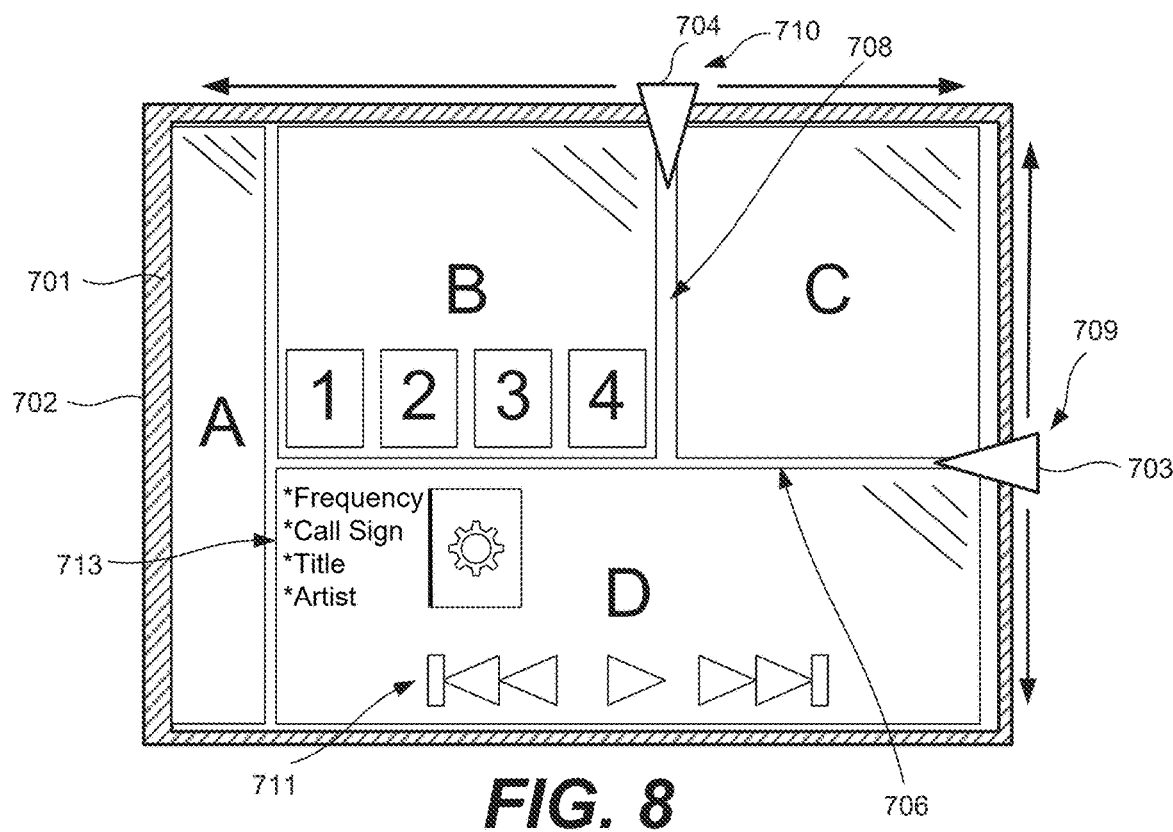
FIG. 8 illustrates an embodiment of the UI of FIG. 7 according to some embodiments.

The example movement of the graphic elements illustrated in FIG. 7 and FIG. 8 may be accomplished by moving the vertical slider control 703 from the first vertical position 705 to the second vertical position 709. In this way a user is able to increase a first percentage of the screen devoted to object "D", while simultaneously reducing a second percentage of the screen devoted to objects "B" and "C".

According to an example embodiment, object "C" is a map and object "D" includes audio controls. In an example driving situation where the user needs to understand upcoming navigation instructions, the user may slide the horizontal slider control 704 leftward and the vertical slider control 703 downward to enlarge the map displayed within object "C". Later, as a relative importance of the navigation instructions is reduced and the user wants to adjust audio settings, the user may slide the vertical slider control 703 upward to enlarge object "D" and the portion of the screen devoted to the audio controls. According to at least one aspect, a size of a graphical element scales with a size of a respective object. For example, a size of the audio controls 711 may be scaled to a current size of object "D".

According to some example aspects, content within an object may be dynamically displayed. In one example, a number of content items displayed within an object is adjusted based on a size of the object as currently displayed. For example, in a case where the horizontal slider control 704 is in the first horizontal position 707, two icons, "1" and "2", are displayed within object "B". At another time, in a case when the horizontal slider control 704 is in the second horizontal position 710, four icons, "1", "2", "3", and "4", are displayed within object "B". In another example, a granularity of displayed data is adjusted based on a size of the object as currently displayed. For example, when the vertical slider control 703 is in the first vertical position 705, first data 712 including an FM radio station frequency and song title are displayed within object "D". At another time, in a case when the vertical slider control 703 is in the second vertical position 709, second data 713 including the FM radio station frequency, radio station call sign, a current song title, an artist name, and artwork associated with the artist or a corresponding album are displayed within object "D".

The example movement of the graphic elements illustrated in FIG. 7 and FIG. 8 is in direct relation to the position of the slides. That is, the movement of the graphic element is equal to a movement of the first physical control. According to some aspects, the movement of objects, graphic elements, or content items may be proportionate to the movement of the sliders. For example, the movement of a slider may cause an object to move two-times a distance moved by the slider, which may speed large adjustments. In another example, the movement of a slider may cause an object to move one-half a distance moved by the slider, which may improve the accuracy of fine movements.

Figure 9:
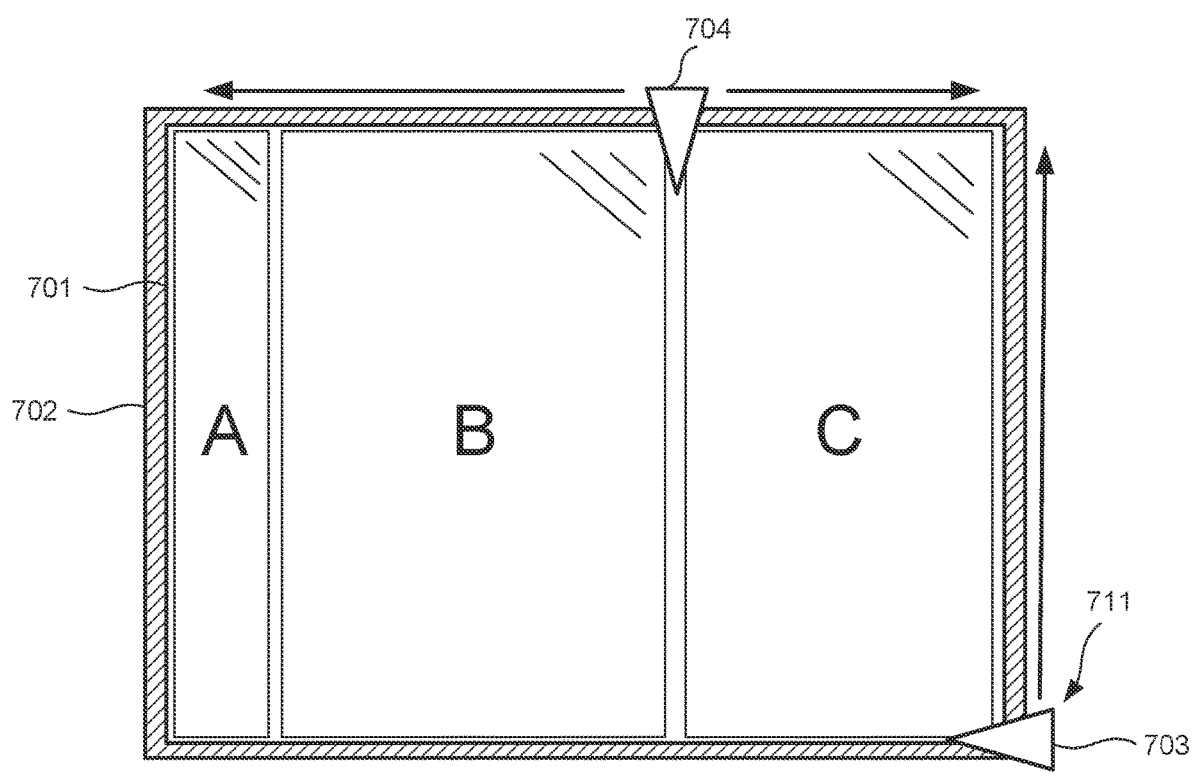
FIG. 9 illustrates an embodiment of the UI of FIG. 7 according to some embodiments.

According to some aspects, the physical controls may be associated with other functions. For example, as illustrated in FIG. 9, a movement of the vertical slider control 703 is moved from a third vertical position 711 may dismiss or eliminate object "D", maximizing a size of objects "B" and "C".

Figure 10:
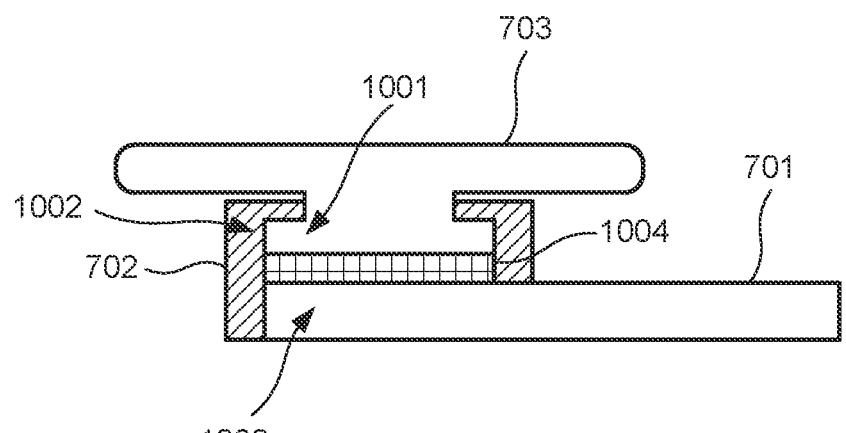
FIG. 10 illustrates an embodiment of a physical control according to some embodiments.

FIG. 10 is an illustration of the display 701, frame 702, and the vertical slider control 703. According to some aspects, the vertical slider control 703 may include a lower projection 1001 that may be captured by the frame 702, such that the control may move along a track 1002 formed by the frame 702. The frame 702 may be at least partially disposed over a peripheral portion 1003 of the display 701. The vertical slider control 703 may include a lower contact portion 1004. The lower contact portion 1004 may contact the peripheral portion 1003 of the display 701. Accordingly, the slider may be used to interact with the display 701 in a case that the display is a touchscreen type display.

The lower contact portion 1004 is formed of a material selected to interact with the peripheral portion 1003 of the display 701. For example, the lower contact portion 1004 may be formed of a conductive material in a case that the display 701 is a capacitive type touchscreen display.

In some aspects, the lower contact portion 1004 may be an extension of the vertical slider control 703. Stated another way, the vertical slider control 703 and the lower contact portion 1004 may be formed of a same material as a unitary piece, and the vertical slider control 703 may directly contact the peripheral portion 1003 of the display 701 in a case that the vertical slider control 703 is formed of a conductive material and the display is a capacitive type touchscreen display. The vertical slider control 703 and the lower contact portion 1004 may be formed of a same material as a unitary piece, and vertical slider control 703 may directly contact the peripheral portion 1003 of the display 701 in a case that the display is a resistive type touchscreen display.

Figure 11:
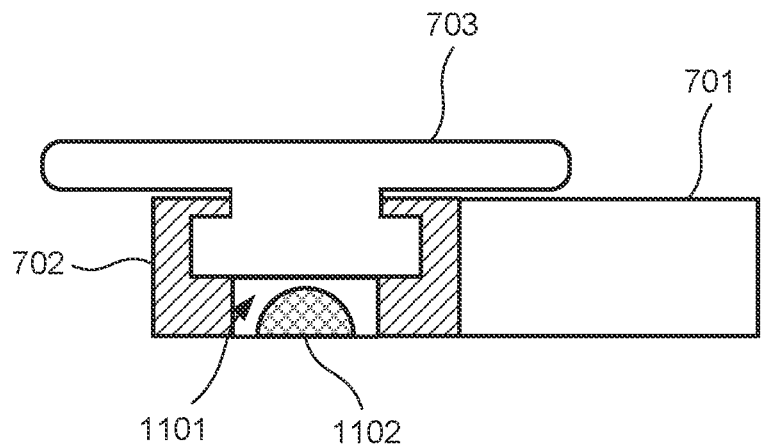
FIG. 11 illustrates an embodiment of a physical control according to some embodiments.

FIG. 11 is an illustration of the display 701, frame 702, and the vertical slider control 703. According to some aspects, the control may be captured by the frame 702, such that the control may move along a track formed by the frame 702. The frame 702 may include a lower recess 1101 which houses one or more position detectors, such as position detector 1102. For example, the position detector 1102 may 1102 may be an infrared detector that detects a position of the vertical slider control 703 as it is moved along the frame 702. In the example of FIG. 11, the display 701 may be a touchscreen type display or a non-touchscreen type display.

Figure 12:
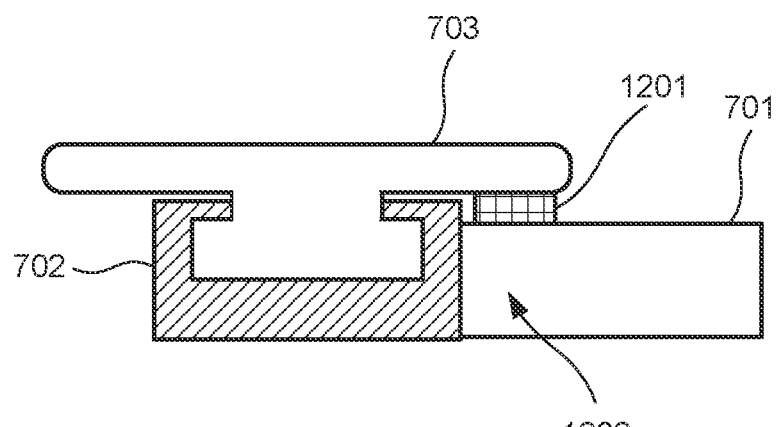
FIG. 12 illustrates an embodiment of a physical control according to some embodiments.

FIG. 12 is an illustration of the display 701, frame 702, and the vertical slider control 703. According to some aspects, the control may be captured by the frame 702, such that the control may move along a track formed by the frame 702. The vertical slider control 703 may include a distal contact portion 1201. The distal contact portion 1201 may contact an edge portion 1202 of the display 701. Accordingly, the slider may be used to interact with the display 701 in a case that the display is a touchscreen type display.

In some aspects, the distal contact portion 1201 may be an extension of the vertical slider control 703. Stated another way, the vertical slider control 703 and the distal contact portion 1201 may be formed of a same material as a unitary piece, and the vertical slider control 703 may directly contact the display in a case that the vertical slider control 703 is formed of a conductive material and the display is a capacitive type touchscreen display. The vertical slider control 703 and the distal contact portion 1201 may be formed of a same material as a unitary piece, and vertical slider control 703 may directly contact the display in a case that the display is a resistive type touchscreen display.

Operating Environment

In one or more embodiments, a vehicle computer system UI is provided. The vehicle computer system UI is a visual type UI and can include a display, a projector screen, or other means of creating a visual impression on a user. For example, the vehicle computer system UI can include a display such as touchscreen display 101 or display 701. The vehicle computer system UI is responsive to user input. The user input may be by physical controls (for example, first physical control 201 or vertical slider control 703), touch input, or other methods of providing input. For example, when a touch input is detected by the vehicle computer system, different objects of the UI may be rendered or manipulated. Accordingly, certain functionality may appear or disappear as a user interacts with the vehicle computer system UI. In this way, an object appearing on the display may be adjusted in response to the user input.

The adjustments of the object can include moving the object, animating the object, changing a color or opacity of the object, or changing the object's size or shape. The adjustments may include a simultaneous adjustment of one or more objects. In one aspect, a size of two window objects may be adjusted as a percentage of a total available screen area.

Figure 13:
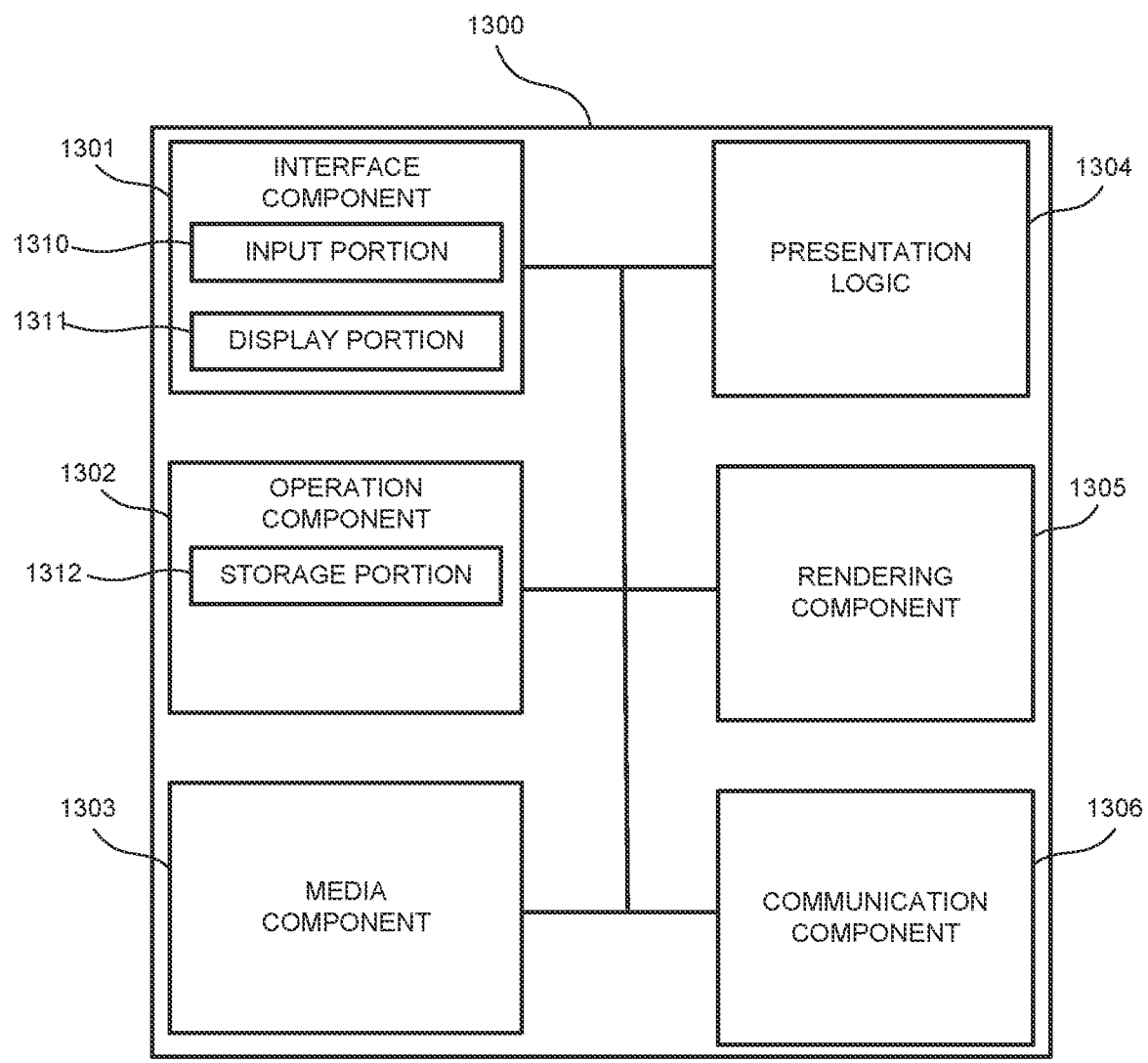
FIG. 13 is an illustration of an example component diagram of a vehicle computer system.

FIG. 13 is an illustration of an example component diagram of a vehicle computer system, hereinafter system 1300, for UI interaction according to one or more embodiments. The system 1300 may include an interface component 1301, an operation component 1302, a media component 1303, a presentation logic 1304, a rendering component 1305, and a communication component 1306.

According to one aspect a vehicle computer system (see computing device 1400, FIG. 14) includes presentation logic 1304 and the rendering component 1305, which facilitate a display of a selectable graphic element by the touchscreen display in an area of the touchscreen display below the physical control as illustrated in FIG. 2 and FIG. 4. According to some aspects, a vehicle computer system includes the presentation logic 1304 and the rendering component 1305, which facilitate a display of a boundary between objects by the display screen, wherein the boundary is moveable according to a change in a position of the first physical control as illustrated in FIG. 7, FIG. 8, and FIG. 9. According to one or more embodiments, a vehicle computer system comprising a presentation logic 1304 and a rendering component 1305 that facilitate a display of a sequence of objects by the display screen, wherein one object of the sequence of objects is displayed at a time according to a position of the first physical control.

The interface component 1301 may include an input portion 1310 and a display portion 1311. The input portion 1310 of the interface component 1301 may 1301 may receive one or more user inputs. In some aspects, the input portion 1310 includes a physical control portion. The display portion 1311 may be a liquid crystal display (LCD), a light emitting diode (LED) display, a projector screen, or another means of creating a visual impression on a user.

The input portion 1310 may include one or more physical controls disposed over a portion of the display portion 1311. The input portion 1310 may provide a physical target for a user. The input portion 1310 may provide tactile feedback. The tactile feedback may be imparted by, for example, a texture of the input portion 1310, or by a detent providing physical feedback when the input portion 1310 is manipulated.

According to some aspects, input portion 1310 may include one or more clickable portions or clickable buttons. The input portion 1310 may enable a user to interact with displayed objects, graphic elements, or content items of the vehicle UI displayed by the display portion 1311 of the system 1300.

The display portion 1311 may display rendered images for the vehicle UI. The display portion 1311 may include a capacitive type touchscreen, such as a projected capacitive touchscreens, a resistive type touchscreen or a glass-film-glass resistive touchscreen, or an infrared touchscreen. In one or more embodiments, the display portion 1311 may be located at a first position. For example, the first position of the display portion 1311 may be a center console position, a dashboard position, a windshield position, or a position projected in view of a driver or user.

In one or more embodiments, the displayed objects, graphic elements, or content items of the vehicle UI displayed by the display portion 1311 of the system 1300 may include one or more of the buttons implemented as soft buttons. In other words, a first button could be defined as a first area of the display portion 1311. Similarly, a second button could be defined as a second area of the display portion 1311. In this way, these soft buttons may be defined by arbitrary boundaries within a touch sensitive or pressure sensitive portions of a display. In one or more embodiments, a user could make a selection with a soft button by double tapping the corresponding touch or pressure sensitive portion or by providing a multi-finger user input, for example. Alternatively, in other embodiments, respective buttons may be physical buttons implemented as hardware or hardware buttons overlaying an area of the display.

The touch sensitive portions, pressure sensitive portions, and buttons enable a user, such as a driver, passenger, operator, or other occupant of a vehicle, to interact with the system 1300 through the interface component 1301. The interface component 1301 may receive one or more user inputs indicative of a command or selection of a content item, and thus control one or more aspects of the vehicle, such as by launching one or more applications, for example. This may be achieved because the input portion 1310 of the interface component 1301 may sense one or more inputs provided at the input portion 1310 by the user. For example, when the user touches physical control overlying the touchscreen, makes a selection using the physical control of the input portion 1310, the interface component 1301 senses or detects these actions as user inputs, and transmits these user inputs to the operation component 1302 or other components of the vehicle UI, which may respond to the user input, thus providing vehicle UI interactivity with user inputs from the user.

The operation component 1302 may response to the user inputs to the vehicle UI, such as user inputs received at the input portion 1310. The operation component 1302 may manage or control the system 1300 for vehicle UI interaction based on these user inputs, thereby enabling selection of objects, graphic elements, or content items. For example, a home screen may be rendered or presented to a user via the display portion 1311. The home screen may be a main screen or a start screen of an operating system on which a vehicle UI runs. The home screen may display one or more objects such as default information, weather, and time widgets, or supplemental functionality may be provided. When the vehicle UI initializes, or at startup, the home screen may be an active application.

The operation component 1302 may include a storage portion 1312 implemented as a hard drive, memory, flash memory, random access memory, read only memory, etc. In one or more embodiments, the storage portion 1312 may store computer executable instructions, one or more of widgets or applications, a state machine associated with different widgets or applications for the operation component 1302. For example, the storage portion 1312 may include computer executable instructions indicative of how the system 1300 responds to user inputs via the input portion 1310.

The media component 1303 may include tuners, radio tuners, antennas, receivers, and radio receivers. The media component 1303 may receive media, content, audio content, video content from one or more content providers, or one or more media sources. For example, the media component 1303 may receive content from radio stations, media from a portable device, media from a wireless connection, or streaming media. In this way, the media component 1303 may enable users or occupants of a vehicle to listen to the radio, watch streaming content, listen to media, or otherwise consume content.

According to some aspects, the presentation logic 1304 may arrange a number of displayed objects given user input from the input portion 1310. For example, the presentation logic 1304 may include computer executable instructions that define a relationship between a user input and displayed objects such as notifications, progress bars, message boxes, and pop-up windows. In one example, the movement of a slider control is linked, via software, to a location of a boundary between objects. In one example, the movement of a slider control displays a sequence of objects, one at a time according to the presentation logic 1304.

The presentation logic 1304 may generate one or more objects, which include one or more graphic elements, one or more interactive graphic elements, or one or more selectable graphic elements. Further, the presentation logic 1304 may 1304 may generate one or more content items based on current conditions. For example, the content item may display information, such as content tiles, times, and distances. The content items do not include an interaction portion. A user may interact with the content item itself, for example, to cause the content item to be displayed or hidden from view according to user inputs.

The object may include one or more interactive graphic elements or selectable graphic elements associated with commands. Examples of commands may include a media selection, play, pause, stop, next track, previous track, volume controls, provide a rating, and more information. In this way, different objects may be generated, shown, or rendered based on interaction or input from a user. Examples of different objects may include a background object, an active application object, a control object, an instruction object, a preview object, a menu object, and an event object.

When an input or user input (e.g., a user selecting the first physical control 201) is detected by the interface component 1301, the presentation logic 1304 may 1304 may manipulated a displayed object, graphic element, or content item. This object, graphic element, or content item may be rendered by the rendering component 1305 for display on the display portion 1311 of the interface component 1301.

Because the vehicle UI is coupled to the communication component 1306 and the media component 1303, the vehicle UI may enable a user to control one or more vehicle systems, such as a telephone system, audio, navigation, infotainment, in-vehicle applications, etc. through the interface component 1301.

Figure 14:
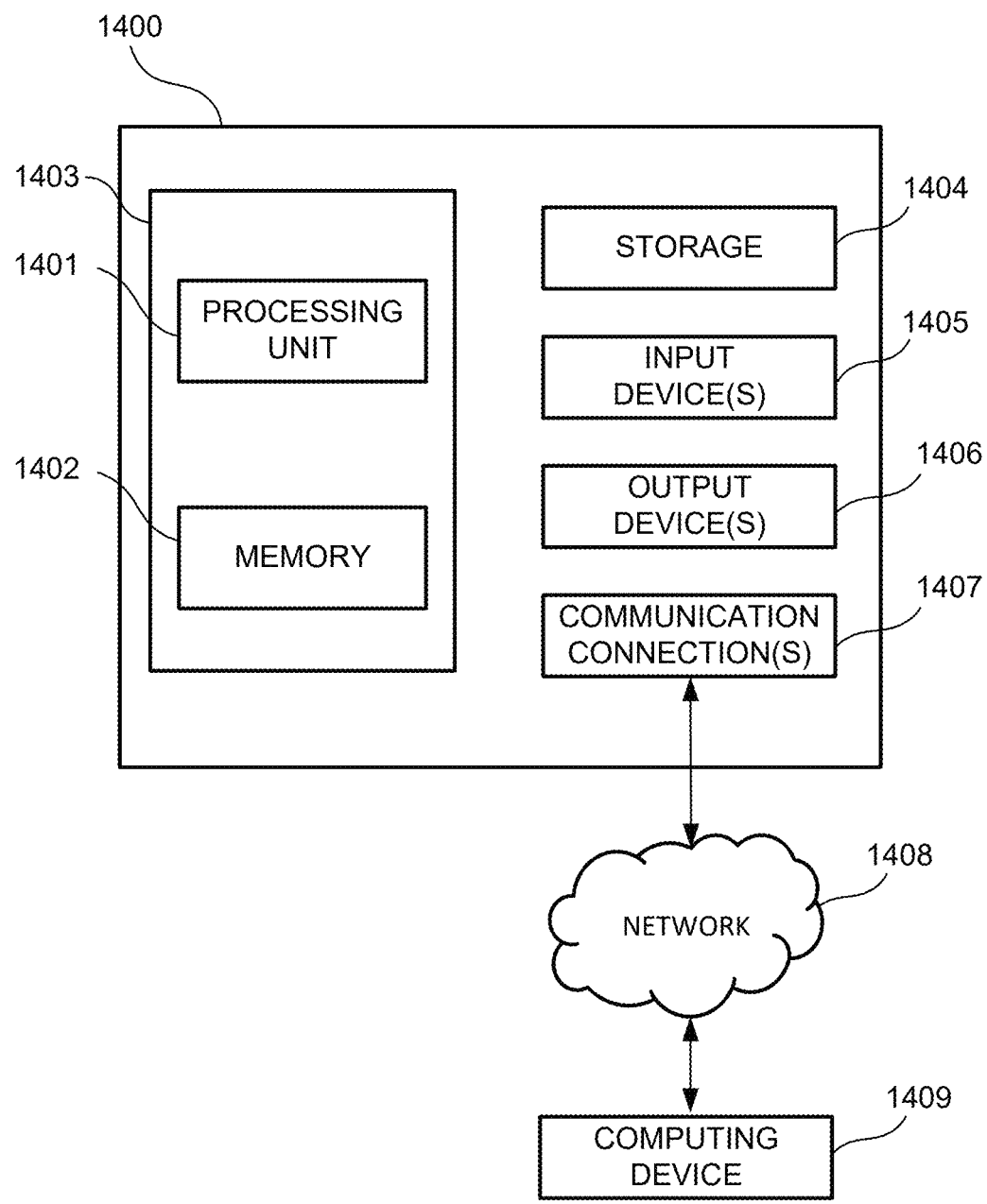
FIG. 14 is an illustration of an example computing device configured to implement one or more embodiments provided herein.

FIG. 14 and the following discussion provide a description of a suitable computing environment to implement embodiments of one or more of the provisions set forth herein. The operating environment of FIG. 14 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media objects, and the like, multiprocessor systems, consumer electronics, mini computers, mainframe computers, distributed computing environments that include any of the above systems or devices, etc.

Generally, embodiments are described in the general context of computer readable instructions being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 14 illustrates a computing device 1400 configured to implement one or more embodiments provided herein. In one configuration, computing device 1400 includes at least one processing unit 1401 and memory 1402. Depending on the exact configuration and type of computing device, memory 1402 may be volatile, such as RAM, non-volatile, such as ROM, flash memory, etc., or a combination of the two. This configuration is illustrated in FIG. 14 by dashed line 1403.

In other embodiments, device 1400 includes additional features or functionality. For example, device 1400 may include additional storage such as removable storage or non-removable storage, including, but not limited to, magnetic storage, optical storage, etc. Such additional storage is illustrated in FIG. 14 by storage 1404. In one or more embodiments, computer readable instructions to implement one or more embodiments provided herein are in storage 1404. Storage 1404 may store other computer readable instructions to implement an operating system, an application program, etc. Computer readable instructions may be loaded in memory 1402 for execution by processing unit 1401, for example.

The phrase computer readable media as used herein includes computer storage media. Computer storage media includes volatile and nonvolatile, removable, and non-removable media implemented in any method or technology for storage of information such as computer readable instructions or other data. Memory 1402 and storage 1404 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1400. Any such computer storage media is part of device 1110.

The term computer readable media includes communication media. Communication media typically embodies computer readable instructions or other data in a modulated data signal such as a carrier wave or other transport mechanism and includes any information delivery media. The phrase modulated data signal includes a signal that has one or more of its characteristics set or changed in such a manner as to encode information in the signal.

Device 1400 includes input device(s) 1405 such as keyboard, mouse, pen, voice input device, touch input device, infrared cameras, video input devices, or any other input device. Output device(s) 1406 such as one or more displays, speakers, printers, or any other output device may be included with device 1400. Input device(s) 1405 and output device(s) 1406 may be connected to device 1400 via a wired connection, wireless connection, or any combination thereof. In one or more embodiments, an input device or an output device from another computing device may be used as input device(s) 1405 or output device(s) 1406 for computing device 1400. Device 1400 may include communication connection(s) 1407 to facilitate communications with one or more other devices. For example, the device 1400 may 1400 may use the communication connection(s) 1407 to communicate via a network 1408 with a user's mobile device 1409.

The embodiments of the disclosure may be systems, methods, and/or computer program products. The computer program products may include a computer readable storage medium, in which a computer readable program instruction that facilitates a processor to implement each aspect of the disclosure is carried.

The computer readable storage medium may be a physical device capable of retaining and storing an instruction used by an instruction execution device. For example, the computer readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, for example, a punched card or in-slot raised structure with an instruction stored therein, and any appropriate combination thereof. Herein, the computer readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer readable program instruction described here may be downloaded from the computer readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter or network interface in each computing/processing device receives the computer readable program instruction from the network and forwards the computer readable program instruction for storage in the computer readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or may be connected to an external computer (for example, connected by an Internet service provider through the Internet). In some embodiments, an electronic circuit such as a programmable logic circuit, an FPGA, or a Programmable Logic Array (PLA) may be customized by use of state personal information of a computer readable program instruction, and the electronic circuit may execute the computer readable program instruction, thereby implementing each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of various blocks in the flowcharts and/or the block diagrams may be implemented by computer readable program instructions.

These computer readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer readable program instructions may also be stored in a computer readable storage medium, and through these instructions, the computer, the programmable data processing device and/or another device may work in a specific manner, so that the computer readable medium including the instructions includes a product including instructions for implementing various aspects of the function/action specified in one or more blocks in the flowcharts and/or the block diagrams.

These computer program instructions can also be loaded to a computer, another programmable data processing device or other devices, so that a series of operating steps are performed on the computer, the another programmable data processing device or other devices to produce a computer-implemented process, and therefore instructions executed on the computer, the another programmable data processing device or other devices may implement the function/action specified in one or more blocks in the flowcharts and/or the block diagrams.

The flowcharts and block diagrams in the drawings illustrate example system architectures, functions and operations of the system, method, and computer program product according to multiple embodiments of the disclosure. Each block in the flowcharts or the block diagrams may represent part of a module, a program segment or an instruction, and part of the module, the program segment or the instruction includes one or more executable instructions configured to realize a specified logical function. In some implementations, the functions marked in the blocks may also be realized in a sequence different from those marked in the drawings. For example, two sequential blocks may actually be executed substantially concurrently and may also be executed in a reverse sequence. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

I claim:

1. A user interface comprising:
a touchscreen display screen;
a frame disposed around the touchscreen display screen;
a first physical control connected to the frame and slidable along an edge of the frame, the physical control being disposed over a first portion of the touchscreen display screen;
a contact portion fixed to the first physical control and contacting the touchscreen display screen; and
a computer system comprising a presentation logic and a rendering component that facilitate a display of a boundary between objects by the touchscreen display screen, wherein the boundary is moveable according to a change in a position of the first physical control;
wherein the presentation logic and the rendering component further facilitate display of a sequence of objects by the touchscreen display screen, wherein at least one object of the sequence of objects is added to and eliminated from the display screen according to a position of the first physical control.

2. The user interface of claim 1, wherein the first physical control is disposed on a vertical edge of the frame, the user interface further comprising a second physical control disposed on a horizontal edge of the frame, the second physical control being slidable along the horizontal edge of the frame and being disposed over a second portion of the touchscreen display screen.

3. The user interface of claim 1, wherein the contact portion is a distal contact portion contacting an edge portion of the display screen.

4. The user interface of claim 3, wherein the distal contact portion is formed of a conductive material and the display screen is a capacitive type touchscreen display.

5. The user interface of claim 1, wherein a peripheral portion of the touchscreen display screen extends under a portion of the frame and the first physical control comprises a lower contact portion contacting the touchscreen display screen at the peripheral portion.

6. The user interface of claim 1, wherein the objects are sized according to the boundary and the position of the first physical control.

7. The user interface of claim 1, wherein a movement of the boundary is equal to a movement of the first physical control.

8. The user interface of claim 1, wherein a movement of the boundary is proportionate to a movement of the first physical control.

9. The user interface of claim 1, wherein the computer system is a vehicle computer system.

10. A user interface comprising:
a display screen;
a frame disposed around the display screen, wherein the frame comprises a lower recess;
a first physical control connected to the frame and slidable along an edge of the frame, the physical control being disposed over a first portion of the display screen;
a position detector configured to sense a position of the first physical control along the edge of the frame; and
a computer system comprising a presentation logic and a rendering component that facilitate a display of a boundary between objects by the display screen, wherein the boundary is moveable according to a change in the position of the first physical control;
wherein the presentation logic and the rendering component further facilitate display of a sequence of objects by the display screen, wherein at least one object of the sequence of objects is added to and eliminated from the display screen according to a position of the first physical control.

11. The user interface of claim 10, wherein the computer system is a vehicle computer system.

* * * * *